E. R. DINGLEY.
Railroad-Track.
No. 210,244. Patented Nov. 26, 1878.
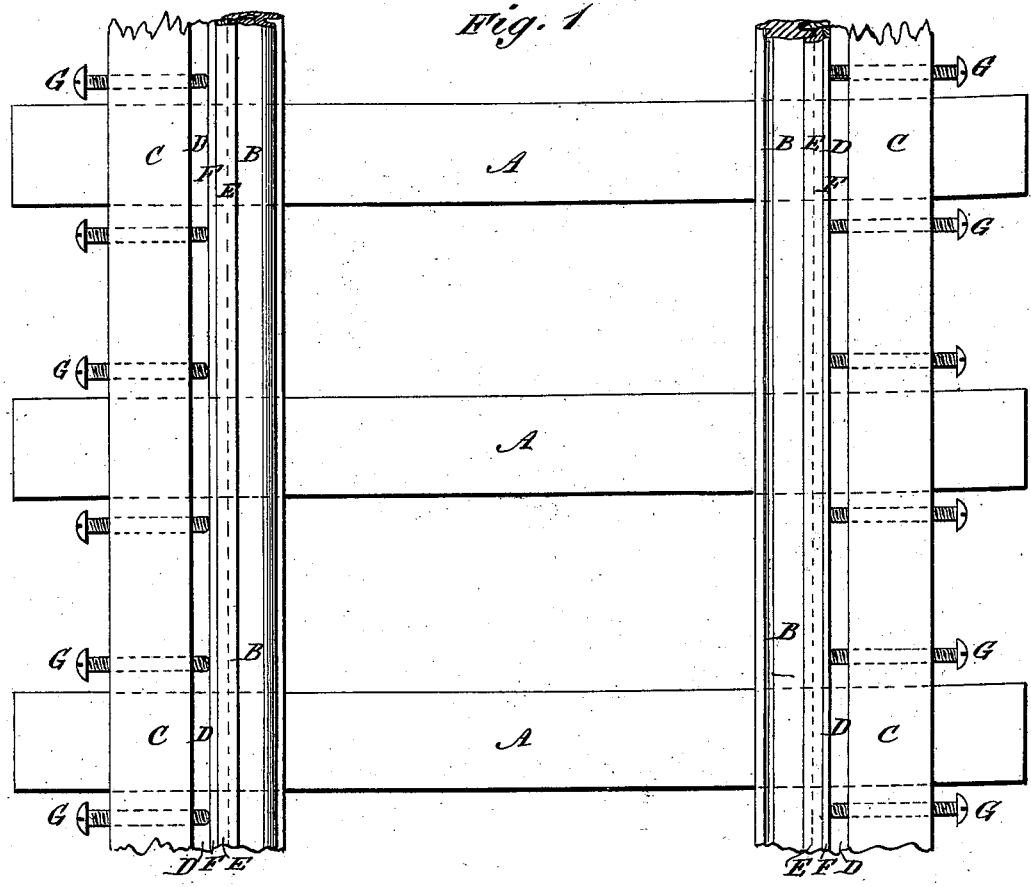
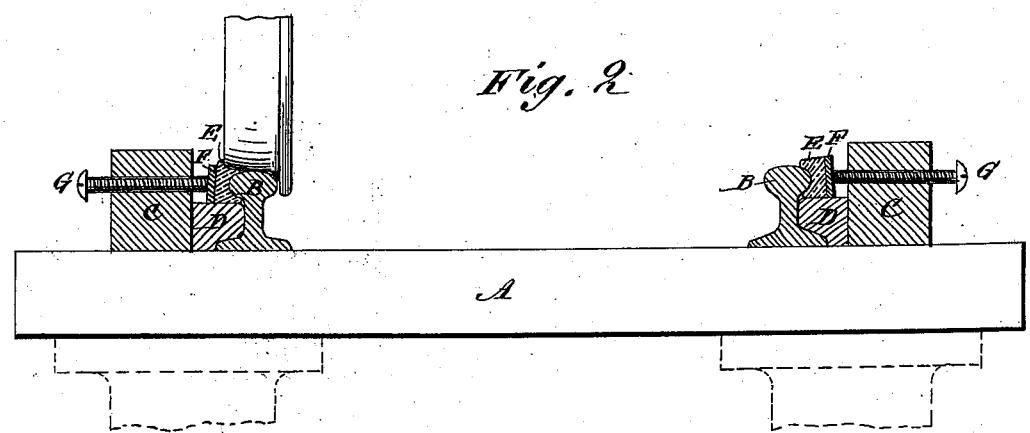
WITNESSES:
C. Neveux
C. Sedgwick
INVENTOR:
E. R. Dingley
BY Munn & Co
ATTORNEYS.

UNITED STATES PATENT OFFICE.

EPHRAIM R. DINGLEY, OF NEW YORK, N. Y.

IMPROVEMENT IN RAILROAD-TRACKS.

Specification forming part of Letters Patent No. 210,244, dated November 26, 1878; application filed October 16, 1878.

*To all whom it may concern:*

Be it known that I, EPHRAIM R. DINGLEY, of the city, county, and State of New York, have invented a new and Improved Railroad-Track, of which the following is a specification:

Figure 1 is a top view of a portion of a railroad-track to which my improvement has been applied. Fig. 2 is a cross-section of the same.

Similar letters of reference indicate corresponding parts.

The invention will first be described in connection with the drawings, and then pointed out in the claim.

A represents the ties, to which the rails B are attached in the usual way. To the ties A, at the outer sides of the rails B, are attached guard-timbers C. Against the outer sides of the rails B, and between them and the guard-timbers C, are fitted wooden bars D, which extend up nearly to the heads of the side rails B. Along the top of the bars D are placed concaved rubber blocks or strips E, and along the outer side of the said concaved rubber blocks or strips E are placed bars F, of metal or wood.

G are set-screws, which pass through the guard-timbers C, and the forward ends of which rest against the outer sides of the bars F, so that by adjusting the said set-screws G the rubber blocks or strips E may be pressed against the sides of the heads of the rails with greater or less force, as may be desired. The concaved rubber blocks or strips E are made so wide that the pressure-bars F will be beyond the reach of the tread of the car-wheels when the flanges of the said wheels rest against the inner side of the heads of the rails B. The rubber blocks or strips E are made so thick as to rise above the heads of the rails B, so as to come in contact with the tread of the car-wheels, and thus stop vibration in them.

With the elastic bearing-blocks E overlapping the head of rail on one side, I not only destroy the side vibration of the rail, but, as the overlapping edge of the block will take the pressure of the outside tread of the car-wheels, the ringing sound usually caused by the wheels will be entirely obviated.

I am aware that it is not broadly new to arrange a sheet of rubber between an iron and a wooden rail, the latter being held in position by screws.

I am also aware that it is not new to apply an elastic filling to the groove of a railroad-track to prevent the accumulation of dirt therein; but

What I claim as new and of my invention is—

A railroad-rail provided with a concaved rubber-bearing-block, E, extending around and over one side of the head of the rail, to destroy the side vibration of the rail and the ringing sound of the wheels of cars, as specified.

EPHRAIM R. DINGLEY.

Witnesses:
 JAMES T. GRAHAM,
 C. SEDGWICK.